United States Patent [19]

Medwed

[11] Patent Number: 4,650,967
[45] Date of Patent: Mar. 17, 1987

[54] HEATING APPARATUS FOR HEATING SHEET MATERIAL BEFORE THE FORMING PROCESS

[75] Inventor: Emmerich Medwed, Wolfertschwenden, Fed. Rep. of Germany

[73] Assignee: Multivac Sepp Haggenmuller KG, Fed. Rep. of Germany

[21] Appl. No.: 758,092

[22] Filed: Jul. 23, 1985

[30] Foreign Application Priority Data

Sep. 25, 1984 [DE] Fed. Rep. of Germany ....... 3435188

[51] Int. Cl.⁴ .............................................. H05B 3/20
[52] U.S. Cl. .................................... 219/388; 425/508; 425/DIG. 13
[58] Field of Search ................... 219/388, 216, 388 S; 264/316 DIG. 45, DIG. 46; 425/508, 507, DIG. 13, 407, 384; 156/322; 100/95 P, 211, 218

[56] References Cited

U.S. PATENT DOCUMENTS

| 3,311,692 | 3/1967 | Baird | 425/384 |
| 3,313,002 | 4/1967 | Wyeth | 425/384 |
| 3,604,053 | 9/1971 | Zemlin | 264/316 |
| 3,607,992 | 9/1971 | Scheiding | 264/316 |
| 4,580,033 | 4/1986 | Sakurai | 219/216 |

FOREIGN PATENT DOCUMENTS

| 3009981 | 10/1981 | Fed. Rep. of Germany . |
| 3141898 | 5/1983 | Fed. Rep. of Germany ...... 156/322 |
| 474347 | 8/1969 | Switzerland . |
| 1086751 | 10/1967 | United Kingdom ................ 264/316 |
| 1456237 | 11/1976 | United Kingdom ............. 355/3 FU |

Primary Examiner—E. A. Goldberg
Assistant Examiner—Teresa J. Walberg
Attorney, Agent, or Firm—Robert T. Gammons

[57] ABSTRACT

Apparatus for uniformly preheating sheet material between opposed, spaced, parallel, heated members movable relative to each other into heat-transferring engagement with the sheet material, characterized in that one of said members has a uniformly-flat, unyielding surface and the other a yieldable surface embodying a plurality of uniformly-distributed protrusions between which there are recesses.

8 Claims, 7 Drawing Figures

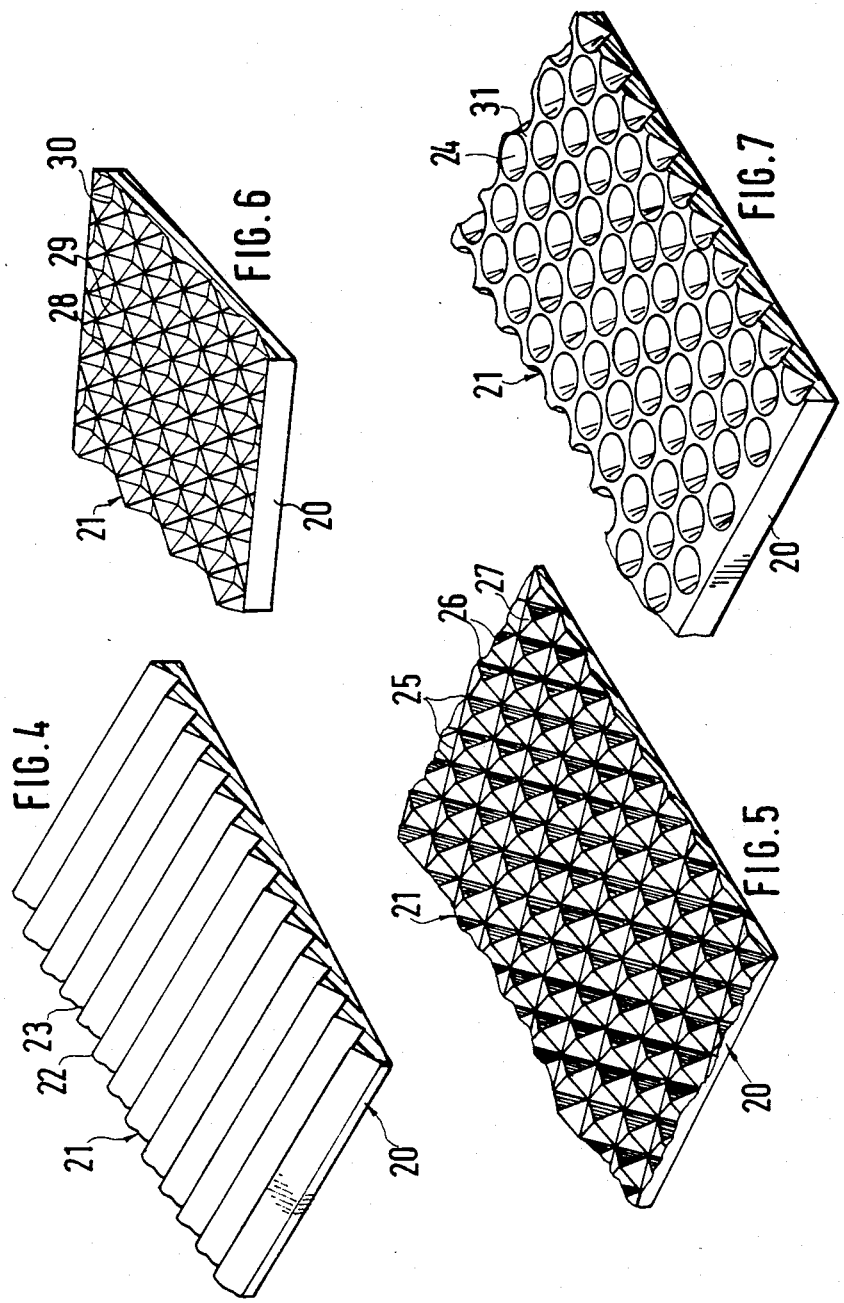

HEATING APPARATUS FOR HEATING SHEET MATERIAL BEFORE THE FORMING PROCESS

BACKGROUND OF THE INVENTION

The invention relates to a heating apparatus for heating sheet material before hot-forming thereof, comprising two members for contacting the two surfaces of the sheet material for heat transfer, one of the members comprising a layer of elastic material facing the sheet material.

A heating apparatus of this kind is known from the Swiss Pat. No. 474 347. The member comprising the layer is formed as a support A, the layer comprising a smooth surface. The German laid open print No. 27 24 957 discloses a heating apparatus for heating sheet material before the hot-forming thereof, comprising a member for contacting the sheet material for heat transfer with a relief-type surface. The sheet material is pressed onto the contacting surface by air-pressing the sheet material to the contact area.

As far as here and further below the term of the relief-type surface is used, it should be understood that, as will be shown by the embodiments described further below, surfaces comprising parts more or less projecting in a raised manner from a plane as well as surfaces comprising a plurality of depressions together with surrounding regions are meant.

In the forming station of a packaging machine a heating apparatus is provided comprising two plate-shaped members having plane surfaces for contacting the sheet material to be heated. One of the plates is stationarily disposed immediately above the sheet material, whereas the second plate is upwards and downwards movable relative to the first plate. In operating condition the second plate is moved towards the first plate in such a manner that the sheet material is interposed between both plates with a predetermined pressure. Both plates are heated and temperature-controlled by means of respective apparatus and transfer heat to the interposed sheet material. In the next operating cycle the lower plate is lowered and the pre-heated sheet material section is moved on into the actual forming tool for forming. If the sheet material to be formed is a hard sheet material, e.g. made of PVC, polypropylene or polystyrene, then this sheet material may have a thickness up to the order of 1 mm. In this case the surfaces of the sheet material are not completely plane parallel, but the thickness of the sheet material has tolerances of about 1/10 of the total thickness in individual regions. If the two plane heating plates are moved towards each other, then air is included in those regions which are depressed due to the unevenesses of the sheet material. The thus formed air cushions prevent an intimate contact between the heating plate and the sheet material and hence a heat transfer to the sheet material. This leads to an ununiform heating in different regions of the sheet material. Thus an unobjectionable deformation of the sheet materials is impossible in particular where the sheet materials lack a sufficiently large tolerance region for the forming temperature.

OBJECTS OF THE INVENTION

It is an object of the invention to provide an improved heating apparatus for heating sheet material, in which the above mentioned drawbacks are avoided. It is a further object to modify a heating apparatus for heating sheet material, in particular in packaging machines, such that the heating even of sheet material having a thickness tolerance is as uniform as possible.

SUMMARY OF THE INVENTION

According to the invention a heating apparatus for heating sheet material before hot-forming thereof comprises two members for contacting the two surfaces of the sheet material for heat transfer, one of the members being formed as a heating plate and comprising a layer of elastic material facing the sheet material, said layer having a relief-type surface.

It is achieved in that manner that the sheet material is uniformly heated even if the sheet material is not completely plane. Additionally, the advantage is achieved that the sheet material no longer tends to stick to the surface of the heating apparatus after heating, when both members of the heating apparatus are moved apart.

BRIEF DESCRIPTION OF THE DRAWINGS

Further advantages, features and objects of the invention will stand out from the following description of examplary embodiments with reference to the drawings. In the drawings

FIG. 4 shows a first embodiment of the material forming the surface on an enlarged scale;

FIG. 5 shows an embodiment modified with respect to the representation of FIG. 4;

FIG. 6 shows a third embodiment of the elastic surface modified with respect to FIG. 4; and FIG. 7 shows a further modified embodiment.

Figure 1:
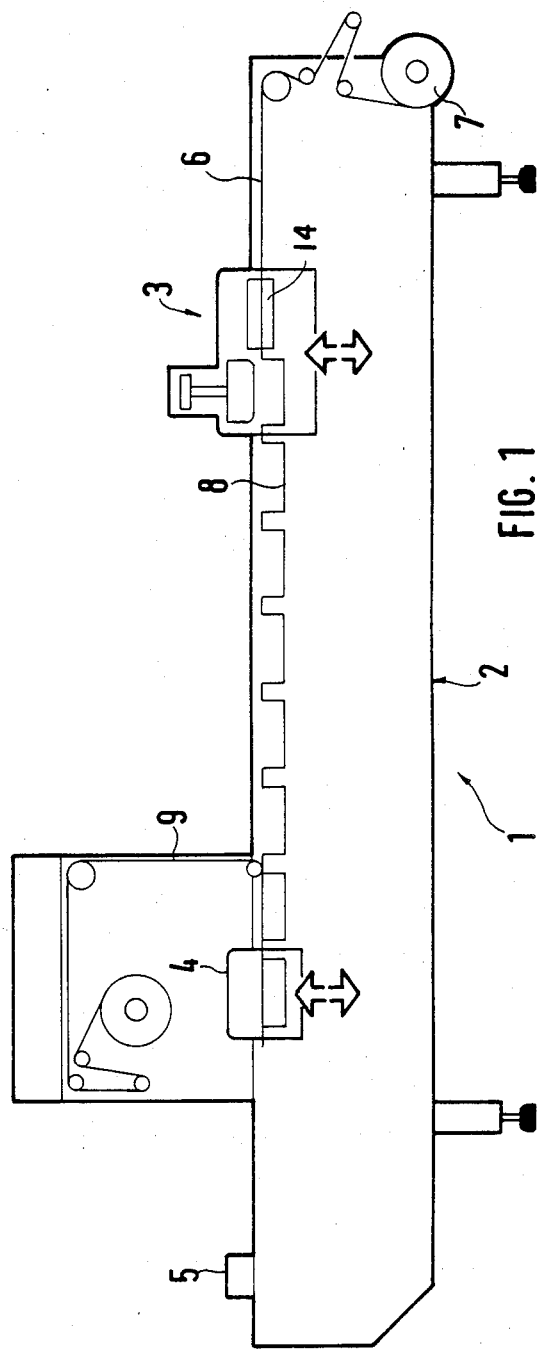
FIG. 1 is a schematic side view of a packaging machine with a forming tool and a heating apparatus therein, the side wall being omitted.

As may be best seen from FIG. 1 the packaging machine 1 comprises a frame 2, a forming station 3, a sealing station 4 and a cutting station 5. A sheet material web 6 is unrolled from a supply roll 7 and passed through the forming station and sealing station towards the cutting station by means of suitable gripping means. In the forming station 3 containers 8 are formed in the sheet material web and subsequently filled and closed in the sealing station by means of a cover foil 9 to be supplied.

Figure 2:
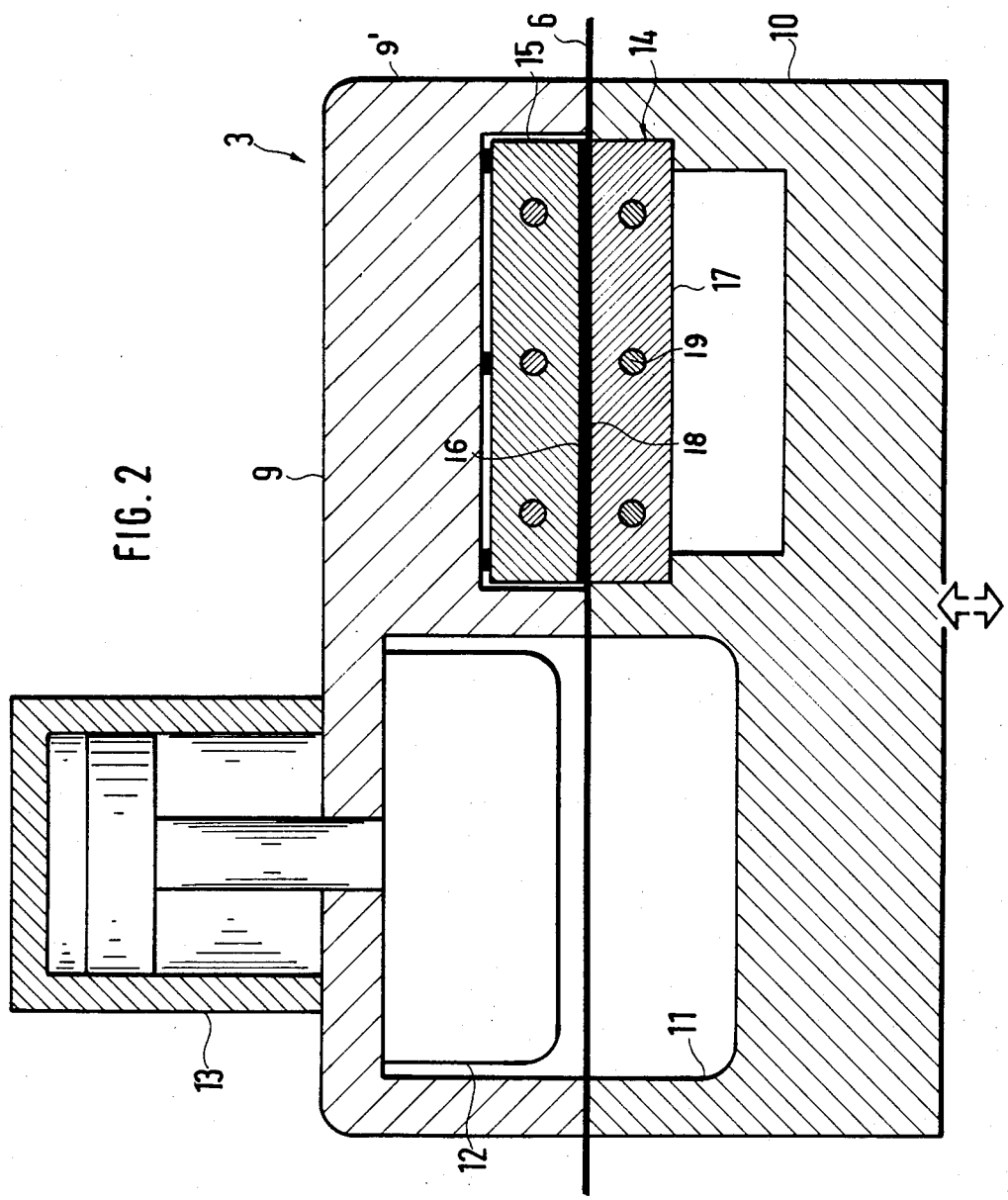
FIG. 2 is a sectional view through the forming station with the heating apparatus in a direction parallel to the feed direction of the material web, the representation being enlarged with respect to FIG. 1.

In the embodiment shown the forming station 3 which may be best seen from FIG. 2 comprises a stationary upper part 9' which is fixedly connected with the frame 2 and a lower part 10 which may be upwards and downwards moved relative to the upper part by means of a suitable hydraulic drive. A forming chamber 11 is provided within the lower part 10. The stationary upper part 9 comprises a forming die 12 above the forming chamber. The forming die is disposed above the sheet material web 6 to be formed and is moved towards the sheet material 6 and into the forming chamber 11 by means of an hydraulic drive 13 such that the sheet material is formed in the desired manner. The forming tool has been described as die stamp tool. However, the forming may be also generated in conventional manner by means of deep-drawing by generating pressure differences above and below the sheet material web.

To heat the sheet material up to the required forming temperature a heating apparatus 14 is provided upstream of the forming section, seen in transport direction of the sheet material web. The heating apparatus comprises a first member formed as a stationary heating plate 15 which is mounted in the stationary upper part 9' in a heat-insulated manner such that a plane surface 16 is disposed directly above the sheet material 6. The heating apparatus 14 comprises a second member formed as a heating plate 17 which is mounted in the manner shown in FIG. 2 in the lower part 10 such that a plane surface 18 thereof fits against the sheet material 6 in the closed state of the forming station 3 and urges the sheet material into contact with both heating plate surfaces 16, 18 in closed state such that heat transfer takes place. In conventional manner the heating plates comprise heating elements 19 for heating the heating plates. These members must not necessarily be plate-shaped. It is important, however, that they have surfaces which are parallel to each other and to the interposed sheet material.

In the above described embodiment the heating apparatus is mounted in the stationary upper part 9' and the lower part 10 of the forming station 3. Of course, however, the heating apparatus may also be provided in corresponding separate housing elements.

Figure 3:
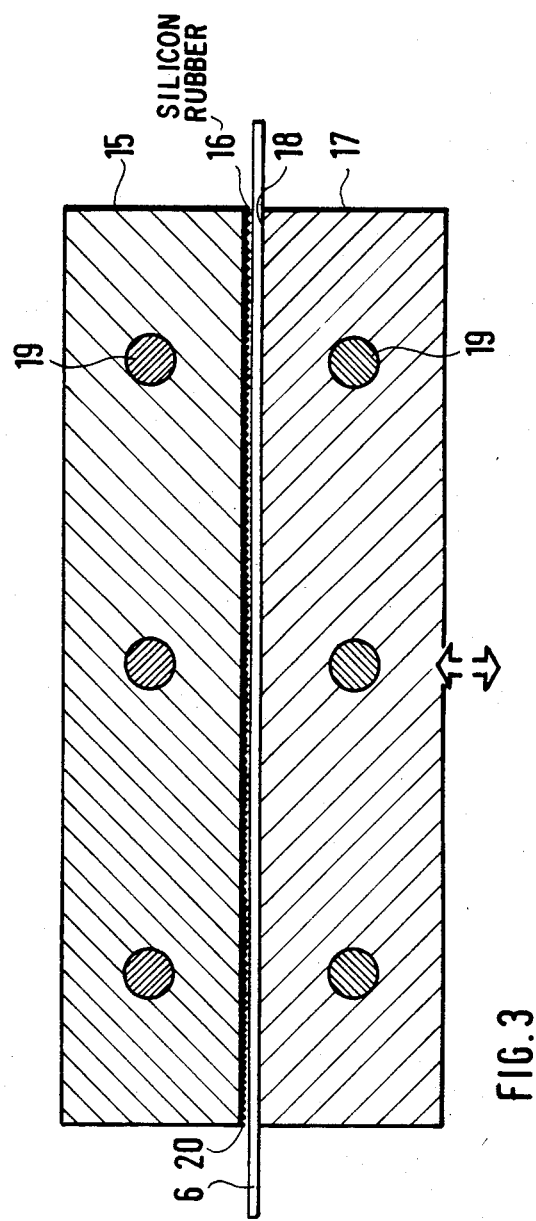
FIG. 3 shows the heating plates of the heating apparatus on an enlarged scale with respect to FIG. 2.

As may be best seen from FIG. 3 the surface 16 of the stationary heating plate 15 which may be brought into contact with the sheet material web 6 for heating thereof comprises a coating 20 consisting of a heat resistent elastomeric material, preferably silicone rubber. The coating 20 comprises a relief-type surface 21 having a large number of protruding regions 22 and depressions 23 therebetween.

FIG. 4 shows an embodiment in which the protruding regions 22 are formed elongated and comprise a substantially triangular cross-section. Respective elongated depressions 23 are disposed between respective adjacent protruding sections. This surface design results in a good elasticity for compensating for unevenesses of the sheet material and in easy withdrawal of air for avoiding air cushions.

In FIG. 5 an embodiment is shown where the active relieftype surface comprises a plurality of parallel to each other extending elongated depressions 25 having a substantially triangular cross-section. A plurality of second elongated depressions 26 extends in an angle of substantially 90° thereto. Thus respective projecting prisms 27 result between four adjacent points of intersection of respective two pairs of elongate depressions 25, 26 extending transversely to each other. This embodiment exhibits a particular good elasticity of the surface for separating the sheet material from the surface of the heating plate, when the heating apparatus is opened, and a good air withdrawal.

A further embodiment is shown in FIG. 6. In this embodiment, the relief-type surface is formed by the crossing of a plurality of protruding regions 28 extending in a first direction and plurality of second regions 29 extending in a substantially right angle thereto. The respective protruding regions have a substantially triangular cross-section. It results therefrom that respective depressed prisms 30 lie between four points of intersection of two pairs of the perpendicularly intersecting protruding regions 28, 29. This embodiment results in good separating properties of the sehet material from the heating surface.

In FIG. 7 an embodiment is shown in which the relief-type surface is formed in that the surface 21 comprises cone-shaped depressions 24 adjacent to each other and protruding regions 31 therebetween.

In order to make the heat transfer as good as possible the thickness of the coating material 20 is selected preferably in the order of up to 1 mm. For achieving a very good heat transfer by contact transfer in spite of the coating, the thickness is preferably selected between about 0.3 and 0.6 mm. A thickness of 0.4 to 0.55 mm and in particular about 0.5 mm is particularly preferred. The depth of the depressions shall correspond to the total thickness of the coating as much as possible in order to obtain as much elasticity and as small a heat insulation as possible. Hence for a thickness of about 1 mm the depth should be only little less than 1 mm. For the preferred thickness of 0.3 to 0.6 mm the depth is about 0.2 to 0.4 mm. The coating 20 is vulcanized directly on the metal surface or glued onto the surface 16 of the stationary heating plate 15 by means of a suitable adhesive.

In operation a compensation of unevenesses of the hard-sheet material due to thickness tolerances is effected by the above described relief-type formation of the surface of the stationary heating plate 15, since the relief-type surface is compressed at the thicker regions more than at the thinner regions of the sheet material. It is further achieved by the relief-type surface that air between the sheet material and the relief-type surface completely escapes such that air cushions are avoided. When the heating plates are pressed onto each other the protrusions are compressed by pressure and spring back into their starting position when the lower heating plate 17 is lowered. Thereby the sheet material 6 is separated from the surface of the upper heating plate 15.

In the above described embodiments the elongate protrusions or depressions, respectively, have been described as triangular. However, in place thereof also slightly rounded protrusions or depressions, respectively, may be selected. The embodiments described in the FIGS. 5 and 6 are particularly preferable because of their relatively large number of individual resilient regions.

According to the invention the surface 18 of the heating plate 17 which may be lowered is formed as a smooth surface which may be provided with a Teflon coating or a similar anti-adhesion coating, if desired. It this coating is not sufficient for separating the sheet material from the heat plate surface, a coating corresponding to the coating 20 may be provided also on this surface.

Hence the invention provides a packaging machine with a substantially improved heating apparatus for the forming station.

Although the invention has been described with reference to specific example embodiments, it is to be understood that it is intended to cover all modifications and equivalents within the scope of the appended claims.

What is claimed is:

1. Heating apparatus for packaging machines having a forming structure for forming sheet material which has been preheated in said heating apparatus, said heating apparatus comprising opposed members arranged to be moved into heat-transmitting engagement with the opposite surfaces of the sheet material to be preheated, said members having parallel surfaces, means for heating said opposed members, the surface of one of said opposed members being unyielding and uniformly flat, and a layer of elastically-yieldable material coextensive with the surface of the other one of said opposed members, embodying a plurality of uniformly-disposed protrusions between which there are recesses and wherein the depth of the recesses corresponds to substantially the thickness of said layer.

2. Heating apparatus according to claim 1, wherein the protrusions on the surface of said layer of elastically yieldable material are elongate in form.

3. The heating apparatus of claim 1, wherein the thickness of the material is about from 0.3 to 0.6 mm.

4. The heating apparatus of claim 1, wherein the depth of the depressions is equal to the thickness of said layer minus about 0.1 to 0.2 mm.

5. Heating apparatus according to claim 1 wherein the protrusions on the surface of said layer of elastically yieldable material intersect at an angle with the recesses therein.

6. Heating apparatus according to claim 1 wherein the surface of said layer of elastically yieldable material is defined by longitudinal and transverse recesses and protrusions therebetween.

7. Heating apparatus according to claim 1 wherein the protrusions on the surface of said layer of elastically yieldable material are elongate and substantially triangular in cross section.

8. Heating apparatus according to claim 1 wherein the means for heating the opposed members are heating elements in said opposed members disposed in spaced, parallel relation to each other and in spaced, parallel relation to said parallel surfaces of said opposed members.

* * * * *